United States Patent [19]

Glennon

[11] 4,133,273

[45] Jan. 9, 1979

[54] SYSTEM FOR THE DISPOSAL OF SLUDGE, HAZARDOUS AND OTHER WASTES

[75] Inventor: Thomas J. Glennon, West Milford, N.J.

[73] Assignee: International Mechanical Contractors, Inc., West Milford, N.J.

[21] Appl. No.: 872,575

[22] Filed: Jan. 26, 1978

[51] Int. Cl.$^2$ .......................... F23G 5/02; F23G 7/00
[52] U.S. Cl. .................................... 110/346; 110/221; 110/222; 110/237
[58] Field of Search ............... 110/237, 238, 221, 222, 110/346, 245, 246, 249

[56] References Cited

U.S. PATENT DOCUMENTS

| | | | |
|---|---|---|---|
| 3,604,375 | 9/1971 | Bruns et al. | 110/238 |
| 3,910,775 | 10/1975 | Jackman | 110/221 |
| 3,916,806 | 11/1975 | Giraud | 110/238 |
| 3,938,449 | 2/1976 | Frisz et al. | 110/346 |
| 3,996,862 | 12/1976 | Besik et al. | 110/238 |

*Primary Examiner*—Kenneth W. Sprague
*Attorney, Agent, or Firm*—Eugene E. Renz, Jr.

[57] ABSTRACT

An ecologically clean process is described for the disposal of partially dewatered waste water sludges in combination with hazardous or noxious chemical wastes, with or without added high calorific waste from other sources which comprises, dewatering the sludge to a solids content of at least about 25% by weight, blending the dewatered sludge with any desired amount of added hazardous chemical waste up to 25% by weight or more, and with 0% up to about 35% by weight of a combustible waste from any other source having a calorific content of at least about 5000 BTU/lb. to obtain a mixture which is at least almost autogeneously combustible and then incinerating said mixture at a temperature of at least about 1400° F for sufficient time to substantially completely combust the mixture to substantially odor-free off gases, said incineration being preferably conducted entirely autogeneously or with a minimal amount of auxiliary fossil fuel.

11 Claims, 1 Drawing Figure

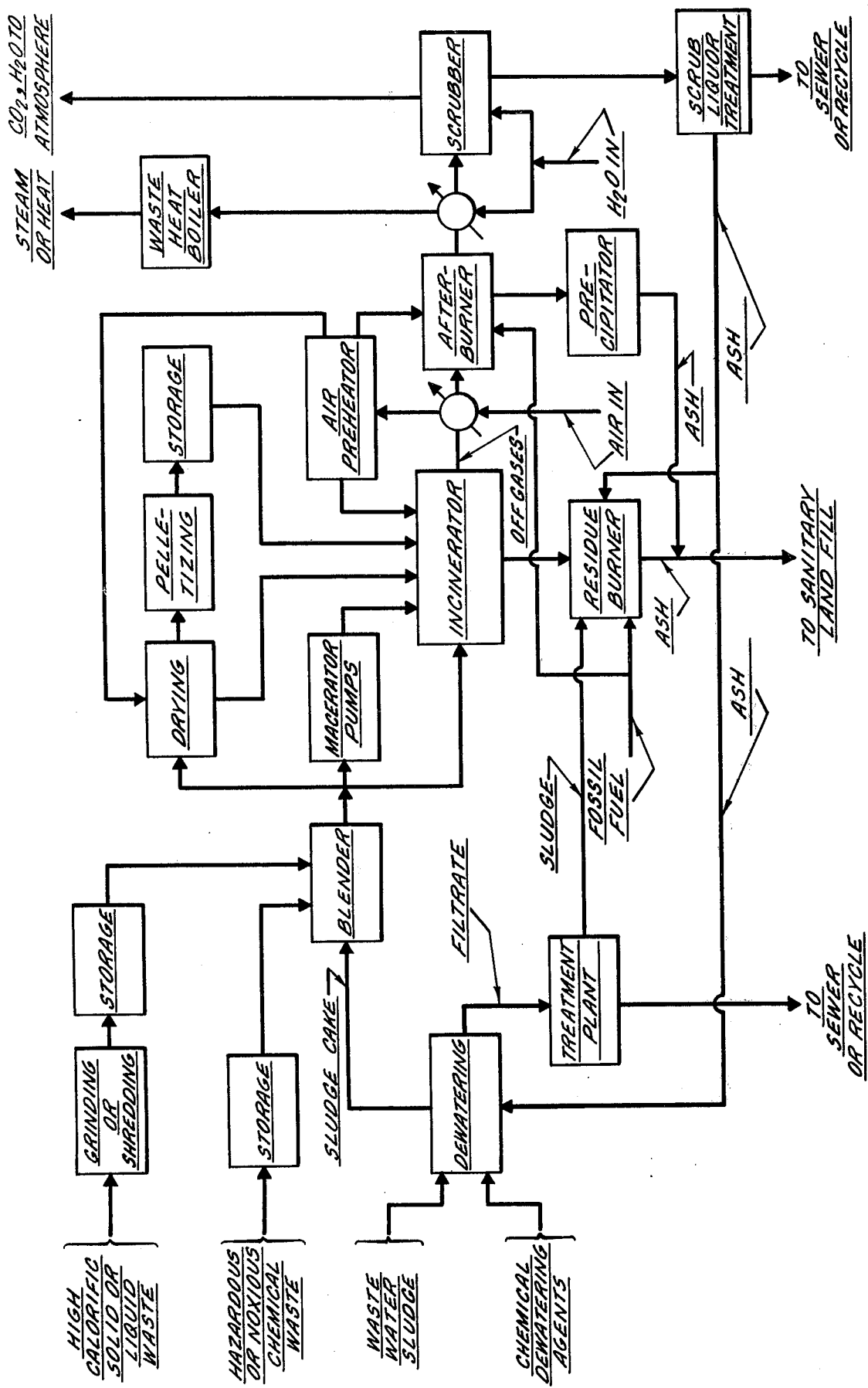

SYSTEM FOR THE DISPOSAL OF SLUDGE, HAZARDOUS AND OTHER WASTES

BACKGROUND OF THE INVENTION

As is well known, the disposal of waste sludges obtained in the treatment of municipal and industrial waste waters has long been a problem and constitutes an ever increasing threat to the environment. Indeed, it is now apparent that governmental regulations will soon seriously limit and probably eventually totally prohibit the ocean dumping of such sludges which has long been the disposal method of economic choice for coastal areas. The only options which will then remain, given present technology, will be using the processed sludges as land fill or compost for agricultural purposes, or disposal by incineration. Due to the limited availability of suitable agricultural or fillable land adjacent large urban areas where the problem is most acute, incineration is the only viable option for the disposal of such industrial and municipal sludges in such areas.

Another problem which is becoming more serious is that of safely disposing of hazardous or noxious industrial or other wastes. Such wastes vary widely in form and chemical content and may consist of solid chemical wastes, aqueous or organic liquid solutions, single or mixed liquid solvents, slurries of solids in liquids, emulsions, and so forth. Such materials may even be corrosive or highly poisonous. Materials of these types have been disposed of in a variety of ways, as by sealing in metal or other containers and sinking the containers in deep areas of the ocean. Such materials have also been pumped into deep underground caves or abandoned mines or the like. Some of the less hazardous materials have been simply buried in the ground in suitable areas. Carefully controlled, especially designed incineration operations employing fossil fuels have also been used. When such substances are buried or pumped underground, care must be taken, of course, that they are deposited either so deeply or in such a place that any noxious materials leached out of the waste by ground water cannot find their way into streams, rivers, lakes or the ocean where fish and other aquatic life, birds, animals or even humans might be harmed. For these reasons a considerable body of technology has been developed for treating such hazardous wastes to render them less noxious and safely disposable. However, such treatments are invariably expensive and the safe disposal of such wastes represents substantial economic as well as ecological problems.

Combustible bulk solid or liquid municipal and industrial waste, such as waste paper and paper board, scrap wood or tree trimmings, municipal trash and garbage, waste oil, or solvents and a host of other materials of this type can, if clean and otherwise suitable, be used as land fill if fillable land is available. Alternatively, assuming that these materials are readily combustible they may be incinerated.

It is well known, however, that the disposal of any of the foregoing waste materials by incineration generally requires the use of an auxiliary fossil fuel. More specifically, many sludges and hazardous wastes are not autogeneously combustible and it is often necessary to employ large amounts of auxiliary fossil fuels not only initially but continuously during the incineration of such materials to achieve satisfactory combustion. The available world supply of fossil fuels is limited and the unequal geographical and political distribution of such fuels is presently causing continuing substantial increases in their cost. It is apparent, therefore, that it is becoming increasingly uneconomic to employ such fossil fuels in the disposal of industrial and municipal wastes and that there is a serious need in the art for the development of technology to minimize the need for such use.

THE PRIOR ART

While the waste disposal problems referred to above are now becoming critical, they have been in existence for many years to a lesser degree and much technology has been developed in this field. For example, Raisch et al. U.S. Pat. No. 1,937,481, issued Nov. 28, 1933, describes a process for sewage treatment and disposal involving refined filtration to remove very fine particles of suspended matter to produce a residue useful as a fertilizer or, due to its high calorific content, for burning. Paper pulp is introduced to the sewage stream, but only as a filter aid.

Flynn U.S. Pat. No. 2,026,969 issued Jan. 7, 1936 teaches a method of disposing of sewage sludge comprising filtering the sludge to effect an initial separation of solids and liquid, adding comminuted combustible material to the filter cake, pelletizing this mixture, and drying the pellets before burning them. The hot gases of the pellet burning operation are employed to dry more pellets.

Porteous U.S. Pat. No. 2,075,224 issued Mar. 30, 1937 describes a process for sewage disposal involving passing sewage sludge in heat exchange relation with recycled previously heated sludge, conveying the cooled sludge to a settling tank, decanting the supernatant liquid, mixing the residue and filtering; the fibrous structure thus produced aiding in the filtration.

Busse U.S. Pat. No. 3,279,603 issued Oct. 18, 1966 describes a process for sewage disposal consisting of burning the sewage after removal of a substantial portion of the initial liquid content by filtration; using the ash from the burning step, having a particle size of less than 0.1 mm, as a filter medium.

Bauman U.S. Pat. No. 3,342,731 issued Sept. 19, 1967 describes a process for dewatering organic sludges by centrifugation after treatment with ash and lime. The dewatered filter cake is incinerated and the ash recycled.

Wiseman U.S. Pat. No. 3,549,529 issued Dec. 22, 1970 describes a method whereby municipal sewage sludge or industrial waste sludges are pulped with ordinary garbage, trash and other municipal refuse to produce an aqueous slurry comprising particles of organic sludge and highly fibrous refuse. The solids content of the slurry is maintained within a range appropriate for ultimate disposal by aqueous state incineration in a wet oxidation reactor. The slurry is delivered directly from the pulping device to the incinerator without dewatering.

Whitehead et al. U.S. Pat. No. 3,836,461 issued Sept. 17, 1974 teaches that solid non-corrosive chemicals having relative low volatility and low solubility, and water immiscible liquid chemicals, as well, can be removed from aqueous waste streams and disposed of in various ways, such as by inclusion in liquid fuels if they have sufficient calorific value. It is also noted that such immiscible liquids may be incorporated in a sludge-fuel oil mixture for utilization as a fuel. It is stated, however, that the process is not suitable for treating aqueous waste streams which contain large amounts of odoriferous or toxic volatile materials, such as sewage, blood, brewery wastes, cyanide waste streams, amine or ammonium hydroxide-containing streams, or corrosive materials such as pickling liquors or chloride-containing wastes.

Fassell U.S. Pat. No. 4,010,098 issued Mar. 1, 1977 describes the treatment of solid waste and sewage sludge by subjecting all or a portion thereof to wet oxidation to reduce the chemical oxygen demand by at least 50% and preferably up to 85% and using excess heat from the wet oxidation to dry the solid waste. The combined solids from the wet oxidation and solid waste are subjected to pyrolysis under non-oxidizing conditions so that the products of pyrolysis are recoverable as valuable materials.

From the foregoing, it will be apparent that the dewatering, pelletizing and incineration of sludges from both municipal and industrial waste water treatment systems are broadly old, both with and without the use of an auxiliary fossil fuel, although such a fuel is generally required. It also appears that various materials such as cellulose fiber, coal or charcoal, garbage, municipal refuse and the like have been added to waste water streams or the sludge recovered therefrom at various stages of the processing for a variety of purposes. It is known, moreover, that the chemical content of waste streams can be separated in some cases and disposed of by burning with a fossil fuel under certain circumstances depending upon the nature of the chemicals. It is apparent, however, that no universally applicable single process has been suggested by the prior art for simultaneously disposing of municipal or industrial sludges and hazardous or noxious chemicals, regardless of type or source, with or without other added combustible matter, all in an ecologically clean manner with minimal or no use of auxiliary fossil fuels.

Therefore, it is a primary object of the present invention to provide an ecologically clean process for disposing of municipal or industrial sludges together with added hazardous or noxious chemicals.

It is a further object of the invention to accomplish the foregoing object by an incineration process, thus avoiding the need for ocean dumping or suitable land for land fill or agricultural disposal.

It is still another object of the invention to accomplish the foregoing objects by an incineration process which requires minimal amounts of auxiliary fossil fuel, if any.

It is yet another object of the invention to dispose of waste water sludges and hazardous or noxious chemicals of all types by incineration in a substantially totally ecologically clean manner so that the off gases are substantially innocuous and the ash residue can be disposed of by surface dumping, since it too is innocuous in itself and contains no water soluble organic pollutants.

SUMMARY OF THE INVENTION

The foregoing and other objects of the invention, which will become apparent hereinafter, are achieved by providing an ecologically clean process for the simultaneous disposal of sludges from municipal and industrial waste water treatment plants and added hazardous or noxious chemical wastes, with or without the presence of added selected high calorific combustible waste from any other source. The new process, in its simplest form, comprises blending sufficiently dewatered sludge with the hazardous or noxious waste and, if used, with other solid or liquid combustible waste, to obtain an autogeneously combustible or nearly autogeneously combustible mixture and then incinerating the same under conditions which ensure substantially complete combustion to produce only innocuous off gases and residual ash.

More specifically, the sludge from municipal or industrial waste water treatment, which typically have a solids content of about 3 to 5% by weight, are optionally thickened by conventional means to a solids content of about 5 to 8% by weight and then further dewatered to a solids content of at least about 25%, and preferably about 35 to 40% or more, by weight, and even up to about 60% solids by weight, by means of special equipment such as cocoa bean or soy bean presses. All percentages herein are calculated on the basis of the weight of dry solids in the total weight of the sludge, or other material specified. While any conventional dewatering apparatus or process may be employed which is capable of achieving the minimum 25% solids content, it it preferred to employ especially efficient dewatering devices capable of achieving higher solids contents. Cocoa bean or soy bean presses are most preferred, since they are capable of achieving the desired 35 to 40% and even up to about 60% solids content partially dewatered sludges.

The hazardous or noxious wastes may be in any form, solid or liquid and are added to the partially dewatered sludge in any desired amounts, but preferably from about 1% up to about 25% by weight of the final autogeneously combustible mixture, although much larger proportions may be employed if the material is combustible or does not seriously hinder combustion of the final mixture. The selected high calorific solid or liquid combustible waste, if required at all, is added in amounts from about 1% up to about 35%, or more, the upper limit being dictated previously by economics. Such wastes should have a calorific value of at least about 5000 BTU/lb. The final combustible mixture which is blended to substantial homogeneity by the use of conventional industrial mixing apparatus and techniques. The exact content of partially dewatered sludge, hazardous or noxious waste, and selected high calorific combustible waste from other sources in the final mixture is selected to achieve a mixture which is at least nearly autogeneously combustible and, preferably, fully autogeneously combustible in the presence of sufficient air, as will be explained fully hereinafter.

The at least nearly autogeneously combustible mixture is then incinerated by means of apparatus and techniques known per se at a temperature of at least about 1400° F. for sufficient time to achieve substantially complete combustion of all components of the mixture. The exact temperature of incineration and residence time under incineration conditions are determined by the requirements of the mixture and the incineration process as will appear below. Auxiliary fossil fuel, if employed at all, is necessary in only minimal amounts at the start-up of the incineration operation to bring the combustible mixture to its ignition temperature, or if necessary, minimal amounts of fuel may be added continuously or intermittently during incineration if the mixture is not fully autogeneously combustible. The incineration operation produces only fully combusted innocuous off gases and ash residue which may be released to the atmosphere and physical environment without ecological harm. In certain circumstances, the off gases and ash may require scrubbing or other minimal treatment prior to release to the environment to remove any remaining insoluble particles, or water soluble, or chemically reactive components, which are recycled to the process.

BRIEF DESCRIPTION OF THE DRAWING

FIG. 1 is a flow sheet of a preferred process of the invention showing schematically and alternatively the preparation and dewatering of the sludge, blending with the hazardous or noxious chemical wastes, and selected high calorific combustible waste, preparation of the blended product, and incineration of the same, and further treatment and disposal of the products of combustion.

DETAILED DESCRIPTION OF THE INVENTION

Before describing the preferred process shown in the accompanying drawing, we will elaborate on the general parameters of the process in order to facilitate an understanding of the specific process illustrated. As is indicated briefly above, the process of the present invention is intended to facilitate the simultaneous disposal not only of sludges from municipal or industrial waste water treatment plants, but also any hazardous or noxious chemical wastes presenting a disposal problem in the geographical region of the plant. The process also provides for the disposal of other solid or liquid waste having a substantial calorific content from any source. The process is designed to be substantially completely ecologically clean and has the particular advantages of being operable in urban areas and adjacent sea coasts where no land is available for land fill or agricultural disposal of such wastes and where ocean dumping or other direct disposal to the environment is either not feasible or entirely prohibited. Very substantial economic advantages are also inherent in the process since the producers of the hazardous or noxious chemical wastes will pay for their disposal thus substantially reducing the cost of operating the process. The solid combustible waste may also be available free of charge for the service of disposal and in some cases where it is presently costing the producer money to dispose of such waste it may even be possible to charge for the disposal, thus further reducing the cost of operation. Even in those cases where it may be necessary to purchase combustible waste for use in the process, the cost of such waste will be based on its calorific value and will be relatively low compared to the cost of expensive fossil fuels which it replaces in the incineration process. Therefore, the process not only solves the problem of disposing of three types of waste but does so in an ecologically clean and economically unprecedented manner.

More specifically, the process involves disposal of the sludges produced in the area by the treatment of waste water from either municipal or industrial treatment plants. Waste solids constituting such sludges are collected by a wide variety of unit operations familiar to those skilled in the art. For example, in a typical waste-water treatment plant a bar screen or similar device is employed to remove gross debris that might otherwise interfere with the proper operation of equipment downstream from the screen. Indeed, it is now becoming common practice to employ additional relatively fine screens to eliminate even more of the relatively large particle size debris. Such fine screens may be of the static type or of the rotary, self cleaning type in which a barrel-shaped screen rotates and is cleansed by the screened waste water as it flows through. The solids removed by such screening techniques contain a certain amount of grit, substantial amounts of light organic material such as rags, vegetable matter, fecal matter and the like. Typically, the dry solid screenings may amount to about 10 to 20% by weight, of the total weight of the solids separated. The fine screens referred to above have been found to be sufficiently efficient in some cases to permit elimination of the conventional primary clarification operation.

However, where conventional primary clarifiers are required or employed, a mechanism is generally also included for the removal of supernatant scum and grease usually by means of a plough which pushes the floating material into a scum box for storage. The calorific content of such scum is generally quite high, on the order of 16,700 BTU/lb of dry solids. This material can, therefore, be blended into the final incineration mixture as a part of the added solid combustible waste material. The remaining settleable solids in the waste water settle by means of gravity to the bottom of the primary clarifier. This settled sludge is then removed from the primary clarifier by means of a scraper mechanism which ploughs the sludge into a sludge hopper. This sludge normally contains about 5% solids on a dry weight basis by weight of the sludge. Such solids are primarily organic matter and generally have a calorific content of about 9500 BTU/lb of dry solids. Such primary sludges containing about 5% solids are normally thickened in a gravity thickener to increase the solids content to about 6 to 8% by weight. This thickening operation generally requires retaining the sludges in the holding tank for several days. Some plants route the primary sludge to an anaerobic digester in order to reduce and stabilize the solids content. Other plants route the primary sludge to an aerated sludge holding tank or digester for a period of ten (10) days or more. While these techniques are suitable for use in preparing sludges for disposal by the present invention, anaerobic and aerobic digestion should be avoided. This is due to the fact that although sludge from a digester can be incinerated, it loses a part of its calorific content by anaerobic or aerobic decomposition of the sludge. This will, of course, counter the goal of obtaining an autogeneous incineration mixture and might require the addition of more combustible solid waste or auxiliary fossil fuel with consequently increased cost.

Waste water effluent from the primary treatment operations referred to above is generally treated further in a secondary treatment plant to remove additional suspended solids and dissolved matter. Such secondary treatment operations usually involve biological means since such means are most efficient and economical for such purposes. More specifically such methods include the use of activated sludge, pure oxygen activated sludge, trickling filtration using rock or plastic media, rotating biological contactors, facultative ponds, stabilization ponds, aerobic lagoons and the like, all of which are well known in the art. Such secondary treatment operations further purify the waste water and separate a biological sludge which also presents a disposal problem. In some plants such sludges are merely recycled to the primary clarifier and thus combined with the primary sludge. This unfortunately results in reducing the solids content of the primary sludge to about 3 to 5% dry solids by weight since the biological sludge normally contains only about 0.2 to 3% solids. Moreover, combined primary and secondary sludges do not thicken as well as the primary sludge alone, therefore, this is not preferred practice. A method for thickening waste biological sludges is gaining popularity, however, which involves the use of a dissolved air flotation unit. In this process the biological waste solids are floated on the surface of the treating unit and skimmed off onto a beaching area for removal to storage. Sludge obtained in this way may be combined with thickened primary sludge and blended into a homogeneous sludge containing as much as 6 to 8% dry solids by weight.

In any event, any of the primary sludges or combined primary and secondary sludges described above must be dewatered further if they are to be incinerated in the process of the present invention. Indeed, the more water that can be removed from such sludges the better in the process of this invention. As noted previously, it is a goal of the present invention to provide an autogeneous combustion mixture, i.e. one that will sustain combustion of itself in the presence of sufficient air without the use of an auxiliary fossil fuel. Therefore, it is desirable, although not essential, that the partially dewatered sludge itself be autogeneous. It is, however, within the scope of the invention to mix high calorific solid waste from other sources with a non-autogeneous sludge to produce an autogeneously combustible mixture. A sludge obtained from a municipal waste water treatment plant, for example, is generally considered to be autogeneously combustible if it contains about 35% dry solids by weight. It should be recognized, of course, that the autogeneity of the sludge depends on factors other than water content such as the nature of combustible solids content of the sludge. Generally, the higher the volatile content of the sludge the more combustible it will be and a lower solids content may be allowable. Of course, the only way to determine the combustibility of a sludge is by actual test as will be explained below.

The further partial dewatering of the sludge to render it autogeneously or almost autogeneously combustible, may be accomplished by a variety of techniques known per se in the art. However, not all of the dewatering methods presently employed are effective to remove sufficient water to provide a partially dewatered sludge sufficiently combustible for the present process. However, at least three methods of the prior art are capable of producing sufficiently dry sludges. These are vacuum filtration, and belt press, and filter press filtration. These methods generally require that the sludge be pre-treated chemically in order to facilitate the removal of the solids from the bulk of the water in the sludge. Chemical preconditioning agents for this purpose are well-known in the art and include ferric chloride, lime, organic polymers and other coagulation and settling agents. The filter press is the most efficient of these methods and is generally capable of producing a partially dewatered sludge containing as much as 40% solids by weight which will be autogeneously combustible in most cases. The vacuum filtration and belt press processes on the other hand are marginally acceptable in the present process since it is seldom possible to achieve sufficient water removal to provide a fully autogeneous sludge by these methods. Such partially dewatered sludges must, therefore, be blended with other solid high calorific waste to provide an autogeneously combustible mixture. This is, of course, one of the advantages of the present invention, i.e. that it is possible to render such sludges suitable for incineration even when they are derived from existing vacuum or belt press dewatering operations.

As noted above, the filter press is the preferred type of conventional dewatering device for the waste water sludges. However, a still more desirable dewatering device for such sludges exists in the form of the filter presses previously employed to extract the desired components from cocoa beans. Such cocoa bean presses are capable of dewatering waste water sludges to provide partially dewatered sludges containing 40% and even higher contents of dry solids. Wine presses may also be employed since it is known that they are capable of taking a material containing, for example, 25% solids, and removing further water to provide a material containing as much as 40% solids. Such wine presses, soy bean or cocoa bean presses may be used subsequently to conventional dewatering processes such as the belt press and the vacuum filter, or even conventional coil filters, rotary drum filters, belt filters, precoat vacuum filters and the like. Similarly, the initial dewatering may be carried out by the use of solid bowl or basket type centrifuges. The soy bean or cocoa bean presses may then be employed to further dewater the sludge to obtain a drier sludge cake, containing up to about 60% solids, by weight, and preferably one which is autogeneously combustible. As noted above, however, even when the sludge cannot be dewatered sufficiently to render it fully autogeneously per se, this may be achieved by blending it with other selected high calorific solid waste.

As is well known to those skilled in the art the particle size of a material has an effect on its ignition temperature and combustibility, the smaller the particle size the lower the ignition temperature and the greater the combustibility, in general. This is due to the known fact that reducing the particle size of a material increases its surface area and thus its exposure to the combustion conditions. The most efficient particle size for incineration, of course, depends to a large degree on the type of incineration apparatus to be employed and the incineration conditions. Generally speaking, a particle size of the partially dewatered sludge or the incineration mixture containing sludge and hazardous or noxious wastes with or without added solid high calorific waste, may be as low as about 0.25 inch or smaller. Such material can be incinerated efficiently in virtually any type of apparatus. It is not always necessary to reduce the material to such a small size, however, since much larger particles may be incinerated in multiple hearth furnaces. Fluidized bed type incinerators, of course, require material sufficiently small or light in weight to be properly introduced to the furnace by pneumatic means and maintained in fluidized condition in the furnace.

The reduction of the partially dewatered filter cake to an appropriate size may be accomplished by any suitable type of conventional apparatus. Such apparatus includes available grinders, shredders, mascerators, beaters, pelletizers and the like. Such equipment is also employed to comminute any selected, solid high calorific waste employed in the process and even to grind the hazardous or noxious chemical waste, if necessary, although the latter seldom requires such treatment.

It is apparent that sufficient storage capacity will be required for the partially dewatered sludge, hazardous waste and any selected solid highly combustible waste from other sources. These materials will then be analyzed as necessary to determine their combustibility and a suitable mixture of the substances will be determined which will be autogeneous when ignited and which can be most efficiently incinerated in the available equipment and under the desired conditions.

Having determined the optimum or at least acceptable proportions of the dewatered sludge, hazardous waste and other selected solid and/or liquid high calorific waste, these materials are combined and blended by conventional procedures to obtain a relatively homogeneous and autogeneously combustible mixture. Relative homogeneity is, of course, necessary, particularly when added solid and/or liquid high calorific waste is used, to ensure that there will be no localized incombustible volumes of material in the incinerator charge. The resulting mixture may or may not be in a suitable form for direct introduction to the incinerator. For example, when the mixture is a broken relatively dry cake it may be simply carried by a suitable conveyor and dumped directly into the top hearth of a multiple hearth furnace without further processing. However, if the mixture is still relatively fluid it could not be thus introduced to a multiple hearth furnace and would first have to be dried further by any conventional means as, for example, by a spray drying operation. Such a drying step may be followed by a pelletizing operation if necessary or desirable to provide material of a particle size offering the optimum specific area to volume relationship for efficient combustion. Intermediate storage facilities can be provided as necessary or desirable to permit control of the feed rate to the incinerator or further blending with other batches of material for the desired calorific content.

When the mixture is to be incinerated in a fluidized bed incinerator, it may be introduced in the fluid state or sprayed directly into the top of the unit from a spray drying operation. In such a case a maceration type pump may be employed to move the semi-liquid material to ensure that the particle size of the spray dried product is small enough to be pneumatically introduced to and fluidized in the incinerator. Alternatively, a broken or comminuted solid cake of the combustible mixture may be introduced to the fluidized bed incinerator by means of a suitable conveyor emptying into the top of the unit.

The crux of the present invention resides in the judicious selection and blending of the waste materials to achieve a mixture which is preferably completely autogeneously combustible, and at least nearly autogeneously combustible. Such mixtures will generally have a calorific value of at least about 5,000 BTU/lb once ignited and provided with sufficient air to maintain combustion. Ideally, no auxiliary fossil fuel is required during the incineration operation although in some circumstances minimal amounts may be required to bring the mixture to its ignition temperature on start-up of the process after shut down or to after burn off gases containing incompletely combusted noxious materials. Minimal amounts of fossil fuel may have to be added continuously or intermittently during incineration, however, when the mixture is not fully autogeneously combustible. The use of auxiliary fossil fuel is more likely to be required when the incinerator is of the multiple hearth type than when a fluidized bed incinerator is employed since the large heat reservoir of the sand bed of the latter precludes the need for added fuel. As is well-known such incineration processes may be designed with largely automated controls for regulation of the amount of air and auxiliary fuel, if any, supplied. Indeed the temperature of the off gases of a fluidized bed incinerator indicates whether or not the process is proceeding autogeneously at the desired temperature of combustion.

The desired temperature of combustion depends upon a variety of factors including the demands of the regulations of the various government agencies, the type of incinerator employed and the nature and chemical content of the waste being incinerated. The present rules of the governmental regulatory agencies permit combustion of ordinary sewage sludges or refuse at a temperature sufficient to substantially deodorize the off-gases of combustion. This may be achieved in a fluidized bed incinerator at a temperature as low as 1400° F. although combustion temperatures up to about 2000° F. or higher may be employed. In this range, a minimum residence time of only about 2 seconds is required in a fluidized bed incinerator to achieve substantially complete combustion and destruction of the organic materials normally present in such waste, assuming that at least a slight excess of oxygen is employed. However, when the wastes contain exotic organic materials such as polychlorobenzene (PCB) pesticides or the like, temperatures as high as 2400° F. and a residence time of about 2.5 seconds are required for complete destruction of the organics to achieve innocuous off gases.

The preferred fluidized bed incinerator system generally operates at virtually the same temperature throughout the fluidized bed and freeboard section of the unit. This provides excellent exposure of the material to the needed temperature for complete combustion and thus obviates any need for an after burner to complete destruction of noxious materials in the off gases. Of course, operation of a fluidized bed incinerator at temperatures in excess of about 2000° F. in order to destroy the exotic hazardous substances, requires the use of high temperature resistant refractories in the construction of the unit. Such incinerators are highly efficient, however, since they require only about 20% excess of the stoichiometric amount of air to achieve complete combustion and thus avoid the necessity of heating larger quantities of excess air to the combustion temperature. The residence time referred to above is generally measured in the freeboard section of the unit, i.e. about 2 to 2.5 seconds there, results in complete combustion and produces substantially innocuous off gases.

Less preferred, but still satisfactory for many plants, are the multiple hearth furnaces for the incineration of the mixed wastes. Such furnaces are not suitable for operation at the 2400° F. temperatures achieved by the fluidized bed method but may be operated at temperatures from about 1400° F. up to about 2000° F. which are sufficient to completely combust all but the most refractory of hazardous wastes. Such incinerators are also less preferred, however, since they also require as much as about 100% excess air (oxygen) above the stoichiometric amount to achieve complete combustion. Therefore, this extra volume of air must be heated to the combustion temperature thus increasing the energy requirements for disposal of the waste. As noted above, it may be necessary in some cases to supply these energy requirements by the use of minimal amounts of auxiliary fossil fuel. Thus may be the case particularly to achieve the ignition temperature of the waste material on start-up after the plant has been shut down and also to complete combustion in an after burner of any components of the off gases not completely destroyed due to the lower operating temperature of the main incinerator.

The known rotary kiln type incinerators are a third type which may be employed in the present invention for either solid or liquid waste and are thus similarly applicable to the fluidized bed incinerators, although less efficient. Such incinerators are normally operated at combustion temperatures of about 1700° to about 2300° F. with residence times of about 30 to 60 minutes. Such operating conditions are adequate to achieve substantially complete combustion of all but the most difficultly destroyable hazardous materials and thus produce innocuous off gases without resorting to an after burner using fossil fuel.

The process of incineration is, of course, an old and rather well studied technique of disposing of waste. In general it consists of burning organic matter and even some inorganic matter with oxygen which is normally supplied primarily by air. It must be recognized, however, that a part of the oxygen may also be supplied by the organic matter being burned. In order for a material to burn, it must first be raised to its ignition temperature. The presence of water in the material to be burned increases the heat energy required to reach the ignition temperature and maintain combustion. This is apparent when one considers that heat energy must be supplied to raise all of the water in the material to 212° F., its boiling point, and that still further heat energy is required to convert the water to steam, before further progress can be made in elevating the waste material to its combustion temperature. Of course, not only the water, but all other components of the waste must be raised to the ignition temperature. This also applies to the air required for combustion. An excess of air must be employed to ensure complete combustion of the waste but large excesses of air are to be avoided for the reason just stated, i.e. that they too must be heated to the ignition temperature. Excess air may be employed as needed to cool the the reaction temperature as necessary if it should autogeneously exceed that necessary or desirable. It is clear, therefore, that both air and water make demands on the energy required to combust waste and except for the optimum volume of air required, should be minimized to avoid the need for an auxiliary fossil fuel. This is the reason that the waste water sludges should be dewatered to the greatest extent feasible prior to incineration. The degree of dewatering required depends on the nature of the waste sludges or other type of combustible material. In general, the higher the content of organic material, particularly the carbon and hydrogen content thereof, the more water that can be tolerated, as noted above. It has been found that waste water sludge containing as little as 35% solids is normally autogeneously combustible. In some instance, depending upon the chemical content of the sludge, as little as 25% solids in the sludge may permit its disposal in the present process, particularly if high BTU/lb selected solid waste is admixed therewith.

In general, the higher the BTU content per pound of the waste material to be incinerated, the higher will be the resulting combustion temperature. If the waste material contains above about 5000 BTU/lb dry solids and only about 65% water it will generally be capable of burning autogeneously. Waste having a lower BTU content will generally require the use of a minimal amount of fossil fuel not only on start up of the plant after shut down in order to initiate the incineration operation but also during incineration to maintain combustion. This may be accomplished by using No. 2 fuel oil, natural gas or any other available fossil fuel, preferably a waste or recycled material of the lowest possible cost. Once the waste has been thus initiated, combustion should be self-sustaining from then on if the waste mixture has been properly calculated or tested to be autogeneously combustible.

When it is necessary to add selected solid and/or liquid high calorific waste in order to render the sludge-hazardous waste mixture autogeneous, any suitable material from any source may be employed. Suitable materials for this purpose include paper, coal, plastics, coconut shells, wood, tree trimmings, bark, sawdust, waste oil, petroleum products, waste solvents, or any other material having a sufficiently high calorific content to raise the mixture to an autogeneous level. This material should be low in cost, if not free, and its cost should be determined according to its calorific value in the process.

As a rule of thumb, it may be stated that waste materials containing only small amounts of exotic refractory organics may be substantially completely combusted at a temperature of about 1600° F. if they contain less than about 65% water, i.e. have a solids content of about 35%, and the solids content has a calorific value of at least about 7000 BTU/lb. If a temperature above about 1600° F. is required to destroy any hazardous or noxious materials in the waste, then the waste must be dewatered further. It should also be noted that it is possible to achieve combustion temperatures as high as 3200° F. when burning organic matter with limited amounts of water. This being the case it is apparent that by proper blending of the three types of waste materials it is possible to provide a mixture of waste having a BTU content such that any desired combustion temperature within the range from 1400° to 1600° F. up to about 3200° F. can be achieved in order to provide substantially odor-free innocuous off gases. As noted previously, however, in the event that the wastes contain noxious or hazardous materials which are not completely destroyed at the operating combustion temperature, it is necessary to provide an after burner for this purpose. Such an after burner requires excess air, which must be heated, and a proper detention time must be provided for complete combustion. This may require the use of minimal amounts of fossil fuel if the necessary heat energy is not otherwise available.

In any incinerator the off gases must be cooled and any entrained particulate matter removed before discharging the off-gases to the environment. This may be accomplished by scrubbing the gases by techniques known per se with water or chemically reactive solutions. High energy venturi scrubbers are especially desirable to meet the stringent demands of the air pollution standards promulgated by the various governmental regulatory agencies. Bag type filters and electrostatic filters are also capable of meeting such standards. The particulate matter obtained in this way is generally innocuous and capable of disposal by conventional procedures, such as by sanitary land fill.

An especially preferred system of the present invention is illustrated schematically in the accompanying flow sheet, FIG. 1 of the drawings. It will be seen that municipal or industrial waste water sludge may be introduced to a dewatering operation. Suitable chemical treating agents such as ferric chloride, lime, organic polymers or the like may also be introduced to the sludge at this point in the system to aid in coalescing the solids content and facilitate the removal of water. The sludge is dewatered by any suitable technique or apparatus referred to above such as vacuum filters, belt filters, filter presses or centrifuges or preferably by the use of cocoa bean or soy bean presses to remove sufficient water to provide a partially dewatered sludge containing at least about 25% and preferably 35 to 40% or up to about 60% dry solids by weight. The filtrate from this dewatering operation is treated further if necessary by secondary treatments discussed above or otherwise to render it suitable for discharge to the municipal or industrial sewerage system, or to a stream, river, lake or ocean.

Hazardous or noxious chemical wastes are obtained and pretreated if necessary and stored. Similarly selected, liquid or solid waste having a calorific content of at least 5000 BTU/lb from any other source is obtained and pretreated, if necessary, by grinding, shredding or otherwise and stored. Each of the waste materials, i.e. the sludges, hazardous chemical wastes and selected solid and/or liquid high calorific wastes are identified and analyzed for their calorific content and demands for complete combustion. A blend or mixture of these materials is then calculated and if necessary pre-tested to determine the conditions of incineration necessary to achieve the desired complete combustion of the mixture, i.e. particle size, ignition temperature, combustion temperature, residence time, amount of excess air, and whether or not the off gases will require after burning or other treatment. Having predetermined a suitable mixture of sludge and hazardous chemicals, with or without added solid and/or liquid high calorific waste, these materials are introduced to a blender in the proper proportions and mixed until a substantially homogeneous incineration mixture is obtained.

Depending upon the type of incinerator employed and the nature of the mixed waste product, the latter may be conveyed to a drying and pelletizing operation or to a macerating pump, if necessary. The thus prepared mixture, in suitable particle size, and having a calorific content sufficient to render it autogeneously or substantially autogeneously combustible, is then introduced to the incinerator. The incinerator is preferably of the fluidized bed or rotary kiln type but may also be of the multiple hearth variety. Air is introduced to the furnace as necessary to provide a sufficient excess of oxygen for complete combustion. Such air is preferably preheated, through heat exchange relation with hot off gases, such as in an after burner or otherwise in a special heater as shown. The off gases from the incineration operations, if already innocuous may be discharged directly to the atmosphere after removing any entrained particulate matter. Otherwise the off gases are led to a fossil fuel fired after burner, if necessary, as shown, to destroy any incompletely combusted hazardous or noxious materials. The heat from the hot off gases may be recovered, if desired, in a water coil associated with a waste heat boiler or otherwise. The cooled off gases are then introduced to a scrubber supplied with water or a chemically reactive solution, if necessary, or other type of particulate separator, to remove any entrained particulate matter or precipitate any dissolved noxious chemicals. The scrubbed cooled off gases having been incinerated at the appropriate deodorizing temperature for the proper residence time, are then entirely innocuous and may be discharged to the atmosphere. Such off gases contain primarily carbon dioxide, water vapor and other non-hazardous gases.

The water from the scrubber is then treated as necessary to remove any suspended matter which is disposed of to the ash removal system and the water is discharged to the sewer.

The solid residue or ash from the incinerator may be discharged directly to the environment in most cases. However, if it contains any hazardous or noxious chemical which is either incompletely combusted or which is in the form of a hazardous water soluble salt then further treatment is indicated. This may be by re-incinerating the ash by burning the residue with auxiliary fossil fuel at a higher temperature and additional excess air, if necessary, or by leaching the material with water or a chemical solution as necessary to eliminate all remaining noxious substances. Any leach water is recycled to the feed portion of the system or stabilized separately. The remaining innocuous residue is then used for land fill.

It will be seen from the foregoing that the process of the present invention provides for the simultaneous disposal of waste water sludges and hazardous materials, with or without other solid and/or liquid high calorific waste, in an ecologically clean and economical manner with minimal or no resort to the use of auxiliary fossil fuel; only innocuous off gases and minor amounts of innocuous solid ash being discharged to the environment.

What is claimed is:

1. An ecologically clean process for the disposal of sludge from the treatment of waste water together with admixed hazardous waste material, which comprises:
   a. dewatering said sludge to form a partially dewatered sludge containing at least about 25% solids, the remainder being water;
   b. blending said partially dewatered sludge with hazardous waste material to provide a substantially homogeneous waste mixture which when brought to the ignition temperature thereof in the presence of sufficient air is at least nearly autogeneously combustible; and
   c. incinerating said at least nearly autogeneously combustible mixture at a temperature of at least about 1400° F. for sufficient time to substantially completely combust said mixture to substantially odor-free off gases.

2. A process according to claim 1 wherein a third waste having a calorific value of at least about 5000 BTU/lb is added to said partially dewatered sludge and hazardous waste material in amounts sufficient to render said mixture at least nearly autogenerously combustible.

3. A process according to claim 2 wherein the mixture to be incinerated has a calorific value of at least about 5000 BTU/lb.

4. A process according to claim 2 wherein said partially dewatered sludge has a solids content in the range from about 25% to about 60% by weight, and the mixture to be incinerated contains at least about 1% to about 25% by weight of said hazardous waste and about 0% to about 35% by weight of said third waste, the remainder being said partially dewatered sludge.

5. A process according to claim 4 wherein the sludge has a solids content of about 35% to about 40% by weight and is autogeneously combustible.

6. A process according to claim 5 wherein the mixture contains up to about 25% by weight of hazardous waste and sufficient of said third waste to render said mixture substantially autogeneously combustible.

7. A process according to claim 6 wherein said mixture has a calorific value of at least about 7000 BTU/lb and a solids content of at least about 35% by weight and is substantially completely combustible at a temperature of about 1600° F. to provide substantially odor-free and innocuous off-gases.

8. A process according to claim 4 wherein the mixture is free from highly refractory organic matter and the incineration is carried out in a fluidized bed incinerator at a temperature in the range from about 1400° F. to about 2000° F. with a residence time of at least about 2 seconds to achieve substantially total combustion of said mixture.

9. A process according to claim 4 wherein the mixture contains highly refractory organic materials such as polychlorobenzenes and the incineration is carried out in a fluidized bed reactor at a temperature up to about 2400° F. with a residence time of at least 2.5 seconds, said conditions being sufficient to destroy said refractory organic materials to produce innocuous off-gases.

10. A process according to claim 4 wherein the incineration is carried out in a multiple hearth furnace at a temperature in the range from about 1400° F. to about 2000° F. with sufficient excess air and residence time to produce substantially innocuous off gases.

11. A process according to claim 4 wherein the incineration is carried out in a rotary kiln incinerator at a temperature in the range from about 1700° to about 2300° F. for a period of about 30 to about 60 minutes sufficient to produce substantially innocuous off gases.

* * * * *